(12) United States Patent
Baez

(10) Patent No.: US 7,011,427 B1
(45) Date of Patent: Mar. 14, 2006

(54) SAFETY LIGHT TUBE

(76) Inventor: Gilbert Baez, 138-35 Elder Ave., Flushing, NY (US) 11355

( * ) Notice: Subject to any disclaimer, the term of this patent is extended or adjusted under 35 U.S.C. 154(b) by 0 days.

(21) Appl. No.: 10/750,641

(22) Filed: Jan. 2, 2004

(51) Int. Cl.
F21L 4/02 (2006.01)

(52) U.S. Cl. .................. 362/191; 362/184; 362/205; 362/223; 362/249; 362/251

(58) Field of Classification Search ............... 362/190, 362/191, 157, 159, 171, 184, 194, 202, 205, 362/217, 223, 227, 249, 251
See application file for complete search history.

(56) References Cited

U.S. PATENT DOCUMENTS

| 3,935,443 | A | * | 1/1976 | Simmons | 362/108 |
| 5,588,734 | A | * | 12/1996 | Talamo et al. | 362/249 |
| 2002/0126473 | A1 | * | 9/2002 | Conti et al. | 362/84 |

* cited by examiner

Primary Examiner—Stephen Husar
Assistant Examiner—Meghan K. Dunwiddie
(74) Attorney, Agent, or Firm—Michael I. Kroll

(57) ABSTRACT

A safety light tube has a light string within the tube and is powered by a battery within a control assembly on the tube. The control assembly has controls such as an on-off switch and a flasher unit. The tube has, at both ends, a clip hook and a hook-and-loop fastener strap, providing dual means for attaching the ends to items such as dog leashes and to parts of the body, such as an arm.

8 Claims, 12 Drawing Sheets

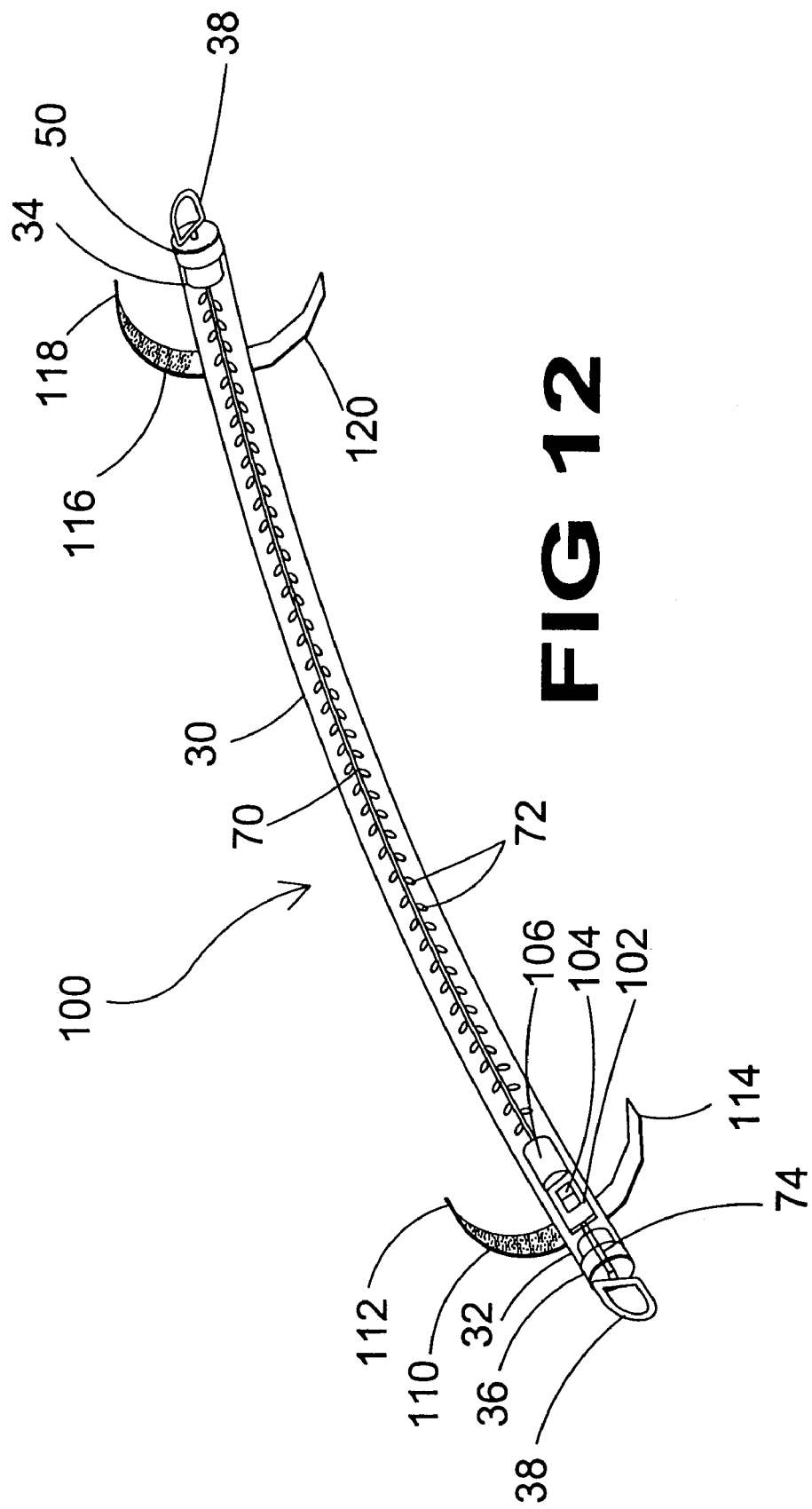

SAFETY LIGHT TUBE

BACKGROUND OF THE INVENTION

1. Field of the Invention

The present invention relates generally to safety devices and, more specifically, to safety lights for use at night by people and pets that will allow for the safe continuation of activity after dark under normally inadequate lighting conditions that would otherwise be considered too dangerous to engage in for a variety of obvious reasons.

2. Description of the Prior Art

There are numerous nighttime safety devices that provide for continued safe activity after dark, however their visibility, while adequate under some conditions, are dependant for the most part on reflected lights such as headlights and street lights for them to work effectively. The absence of adequate lighting would render these devices virtually useless and would place the user in a dangerous situation. While these other devices may be suitable for the purposes for which they where designed, they would not be as suitable for the purposes of the present invention as heretofore described. What is needed is a device that provides its own illumination and is therefore independent of ambient lighting conditions. The device should be easily and securely positionable on a variety of objects typically associated with nighttime outdoor activities.

SUMMARY OF THE PRESENT INVENTION

The present invention relates generally to safety devices and, more specifically, to safety lights for use at night by people and pets that will allow for the safe continuation of activity after dark under less-than-adequate lighting conditions which would otherwise be considered ill advised. The device is a long, linear array of small battery-powered, switch-operated lights encased in a clear, flexible, plastic tube. The tube and switch box are capped and sealed so as to be water resistant to prevent short circuits during inclement weather. The present invention is designed to be attached to a leash for use as a nighttime pet safety device or to be worn by people. The means of attachment provided include clip hooks, as well as, straps with hook-and-loop fasteners at either end. This allows for attachment to pet leashes or around the user's body using either or both means.

There are several factors that cooperate to make the present invention an effective product most suitable to its intended purpose. Its novel configuration and self-illumination call attention to the wearer. This factor alone creates a safer nighttime walking condition. Even when no motion is present, the intensity of the present invention is more than sufficient to provide adequate visibility for successful collision avoidance by motorists under normal nighttime traffic and ambient lighting conditions.

With the introduction of motion to the scenario of a pet owner and pet walking together at night both wearing the present invention, an even greater margin of safety is provided by the prominent visibility of the unusual spectacle of motion and light. The attention getting visibility afforded to the wearer is also a deterrent to crime since criminals typically look for potential victims under conditions that will not call attention to themselves or to their intended victims. In short, the present invention provides a level of safety for nighttime activity not achieved by any other device in its field.

A primary object of the present invention is to provide a safety light tube having its own power supply.

Another object of the present invention is to provide a safety light tube that will have motion in addition to self-illumination for an added measure of visibility and safety.

Still another object of the present invention is to provide a safety light tube having a flash function control means which would enable the user to change the operation of the light array between various functions that could include but are not limited to: steady on, fast flash, slow flash, sequential, and twinkle.

Another object of the present invention is to provide a safety light tube that can be worn by the user to increase visibility of police, emergency service workers, joggers, children and any other person or object that desires to increase visibility in low light conditions.

A still further object of the present invention is to provide a safety light tube that utilizes a plurality of attachment means including but not limited to clips and straps with hook-and-loop fasteners.

Another object of the present invention is to provide a safety light tube for pets that can be secured to a leash for prominent visibility using either clip hooks or hook-and-loop straps as the attachment means.

Another object of the present invention is to provide a safety light tube for people that can be secured to a belt or around the waist for prominent visibility using either clip hooks or hook-and-loop material attachment means.

A yet further object of the present invention is to provide a safety light tube for people and their pets that is water-resistant.

Yet another object of the present invention is to provide a safety light tube for people and their pets that is shock-resistant.

Another object of the present invention is to provide a safety light tube for people and their pets that may be easily switched on and off.

A further object of the present invention is to provide a safety light tube for people and their pets that has adequate power for long operation.

Additional objects of the present invention will appear as the description proceeds.

There is provided an illumination device powered by a portable electric power source, comprising: a hollow, elongated member having a first end and a second end, the elongated member being at least partially transparent; a light string within the elongated member, the light string having a plurality of spaced light members; a control assembly attached to the elongated member and adapted for receiving electric power from the portable electric power source, and further adapted for holding the portable electric power source, the control assembly having a switch, the control assembly being in electric communication with the light string such that operation of the switch electrically activates the light string and the light members; and a first end attachment member attached to the elongated member proximate the elongated member first end.

In some embodiments, the portable electric power source comprises at least one battery.

In some embodiments, the device further comprises a second end attachment member attached to the elongated member proximate the elongated member second end.

In some embodiments, the first end and second end attachment members each comprise a clip hook.

In some embodiments, the first end and second end attachment members each comprise a fastener strap.

In some embodiments, the fastener strap comprises two ends each end having a hook-and-loop portion, the ends being fastenable by joining the hook-and-loop portions.

In some embodiments, the first end attachment member further comprises a plurality of attachment members and the second end attachment member further comprises a plurality of attachment members.

In some embodiments, the first end attachment member is a clip hook.

In some embodiments, the clip hook has a ring, the ring being hookable by the clip hook.

In some embodiments, the first end attachment member is a fastener strap.

In some embodiments, the control assembly comprises a flasher unit and a flasher unit control for activating the flasher unit, such that when the flasher unit is activated the light members flash.

In some embodiments, the control assembly has a first portion and a second portion, the first portion having the switch and being attached to the elongated member, the portable electric power source being contained in the second portion, the second portion being removable from the first portion such that the second portion is separated from the elongated member.

An illumination device is provided, the device powered by a portable electric power source, comprising: a hollow, elongated member having a first end and a second end, the elongated member being at least partially transparent; light means within the elongated member; control means for holding the portable electric power source and receiving electric power from the portable electric power source, the control means comprising a switch, the control means being in electric communication with the light means such that operation of the switch electrically activates the light means; and first end attachment means attached to the elongated member proximate the elongated member first end.

In some embodiments, the device further comprises a second end attachment means attached to the elongated member proximate the elongated member second end.

In some embodiments, the first end attachment means further comprises a plurality of attachment means and the second end attachment means further comprises a plurality of attachment means.

There is provided an illumination device powered by a portable electric power source, comprising: a hollow, elongated member having a first end and a second end, the elongated member being at least partially transparent; a light string within the elongated member, the light string having a plurality of spaced light members; a control assembly attached to the elongated member and adapted for receiving electric power from the portable electric power source, and further adapted for holding the portable electric power source, the control assembly having a switch, the control assembly being in electric communication with the light string such that operation of the switch electrically activates the light string and the light members, the control assembly further having a flasher unit and a flasher unit control for activating the flasher unit, such that when the flasher unit is activated the light members flash; and a first end attachment member plurality attached proximate the elongated member first end, and a second end attachment member plurality attached proximate the elongated member second end, each plurality having a clip hook and a fastener strap, the fastener strap comprising two ends, each end having a hook-and-loop portion, the ends being fastenable by joining the hook-and-loop portions.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 12 depicts an alternate control assembly with a detachable battery compartment portion.

DETAILED DESCRIPTION OF EXEMPLARY EMBODIMENTS OF THE INVENTION

The following discussion describes in detail exemplary embodiments of the invention. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
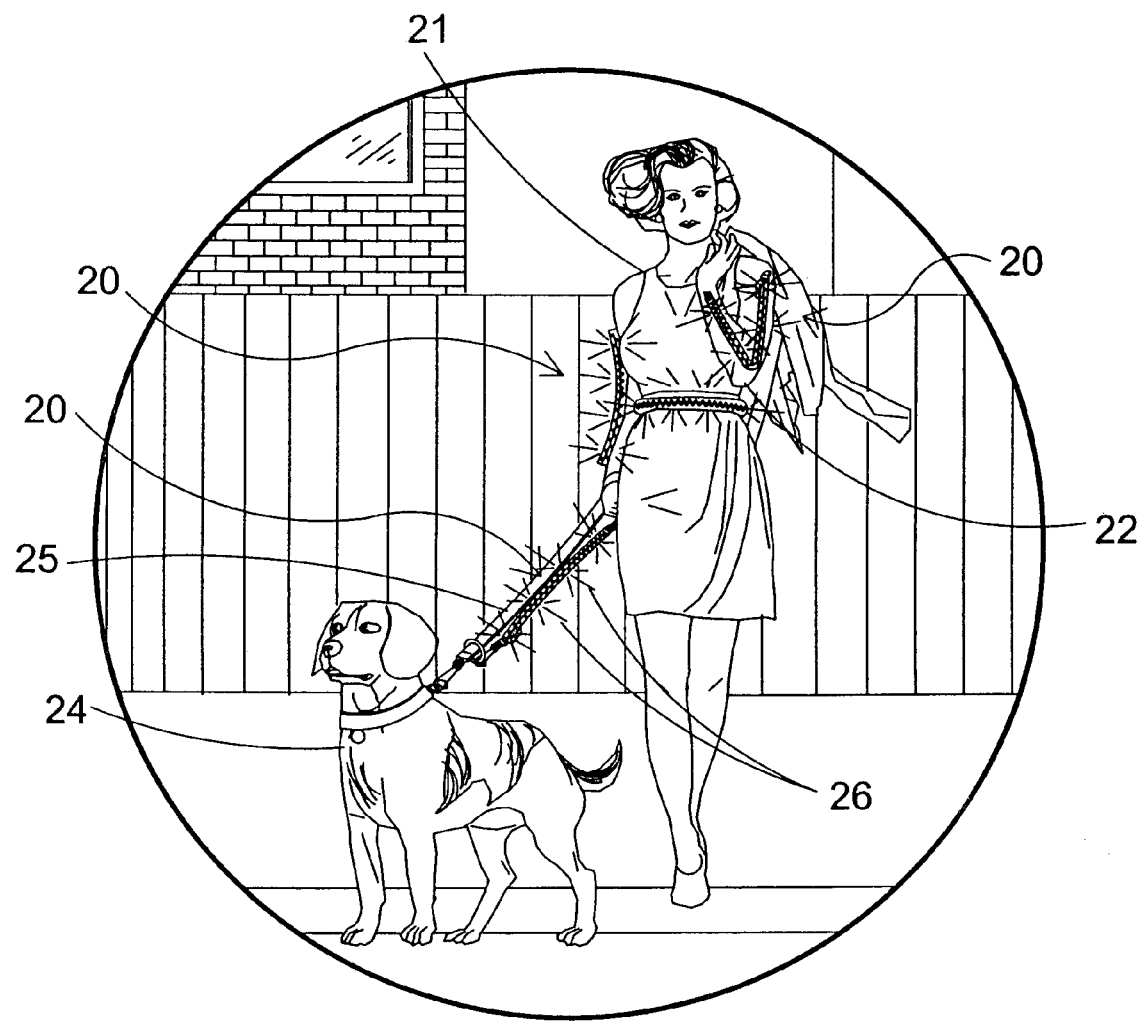
FIG. 1 is a view of a typical owner/pet nighttime traffic scenario showing an exemplary embodiment of the present invention in use by both as they proceed to cross a street.

Several uses of the device 20 are illustrated in FIG. 1, where the device 20 is shown on the user's 21 arm 22. Also shown is the user's dog 24 on a leash 25, with the device 20 attached to the leash. The device emits light 26 along a substantial portion of its total length.

Turning to FIGS. 2–6, an exemplary embodiment of the device 20 is shown to comprise a hollow, elongated tube member 30 having a first end 32 and a second end 34, the elongated member being at least partially transparent and flexible. The device 20 includes an end cap 36 that seals the tube first end, the end cap having a swivel loop 38 to which is attached a clip hook 40. the clip hook is free to move along the swivel loop.

Attached to the tube 30 proximate the first end 32 is a loop 42 through which a fastener strap 44 is threaded, the strap having a first hook-and-loop portion end 46 and a second hook-and-loop portion end 48 for joining the strap 44 about various objects such as the person's arm 22 in FIG. 1.

A second end cap 50 seals the tube second end 34. A swivel loop 52 is attached to the second end cap and a clip hook 54 is attached to the swivel loop. A loop 56 is attached to the tube proximate the second end, through which a fastener strap 58 is threaded. The fastener strap has a first hook-and-loop portion end 60 and a second hook-and-loop portion end 62 for joining the strap 58 about various objects.

Figure 2:
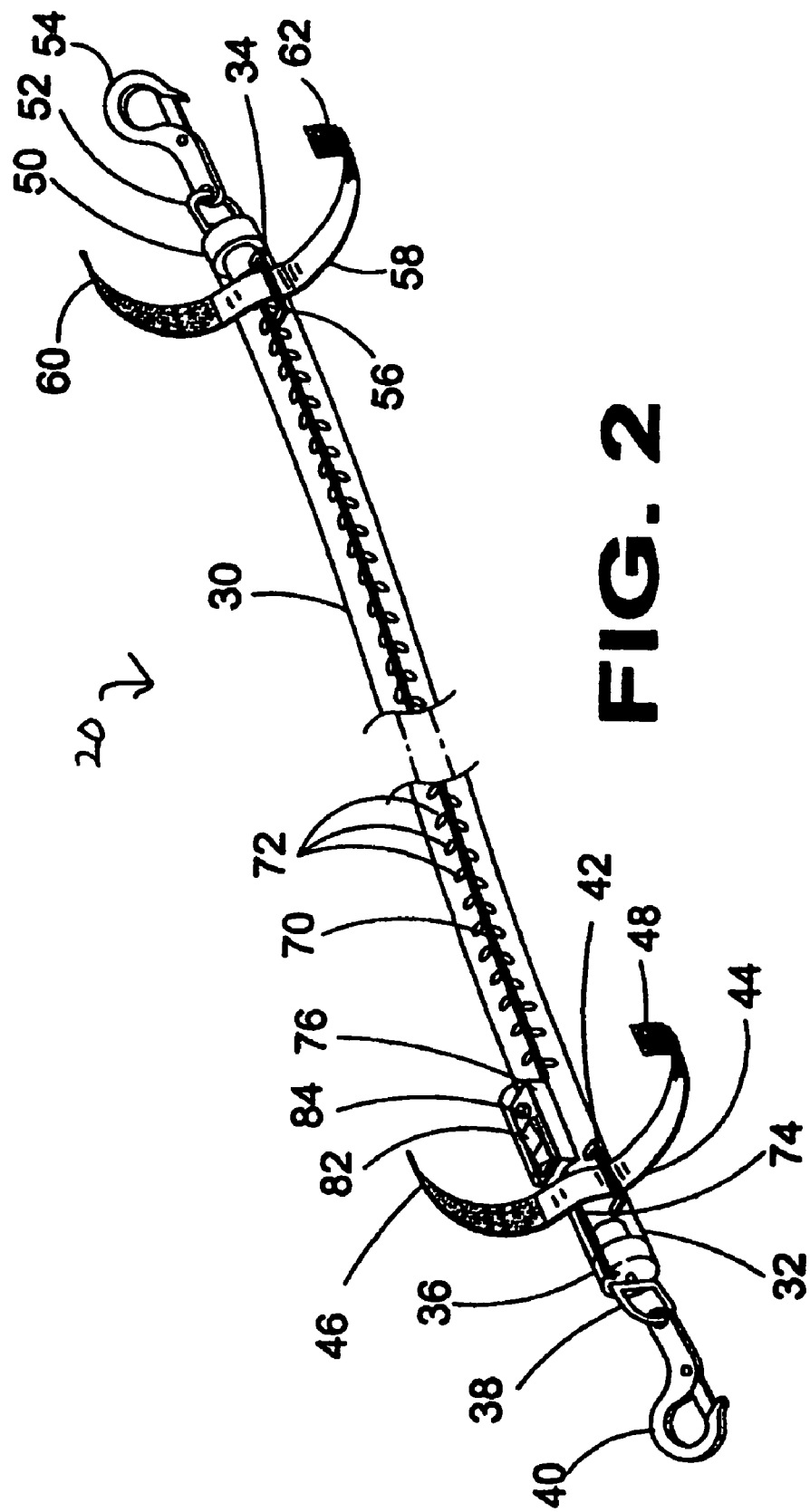
FIG. 2 is a perspective view of an exemplary embodiment of the present invention.

As shown in FIG. 2, the device includes a light string 70 within the tube 30, the light string having a plurality of conventional light members 72 spaced along the length of the tube. The light string and lights are in electrical communication through conventional wires 74, the wires exiting the tube for communication with the control assembly 76. In the embodiment, shown in FIG. 3 the wires exit through the tube first end 32. In some embodiments, the wires exit through the tube wall.

Figure 3:
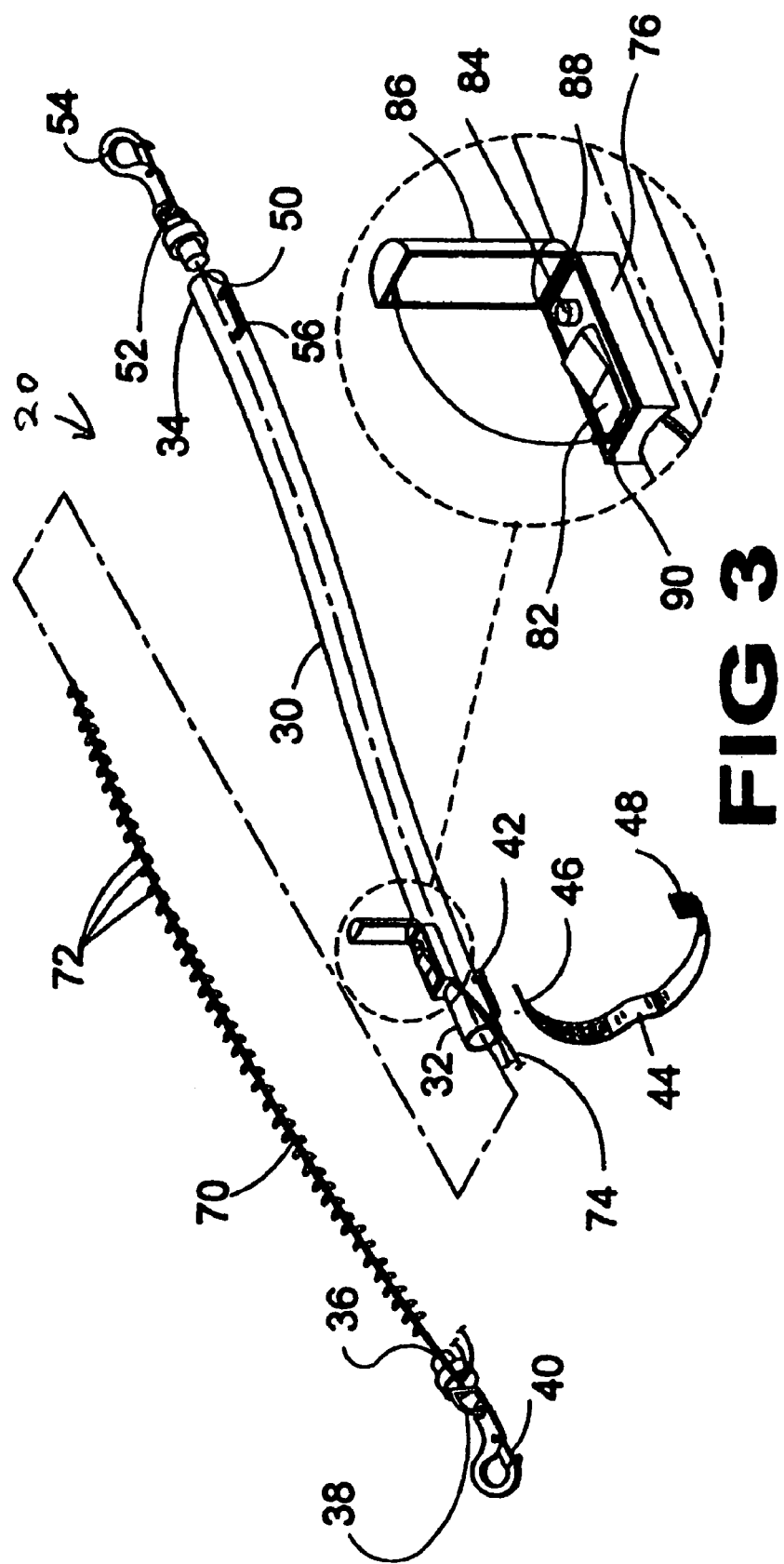
FIG. 3 is an exploded perspective view of an exemplary embodiment of the present invention with a detailed view of the switch box showing an on/off switch and a flash function control button. A spring-loaded hinge keeps the cover (shown here in the open position) firmly closed against the rubber gasket to protect the internal components from moisture.
Figure 4:
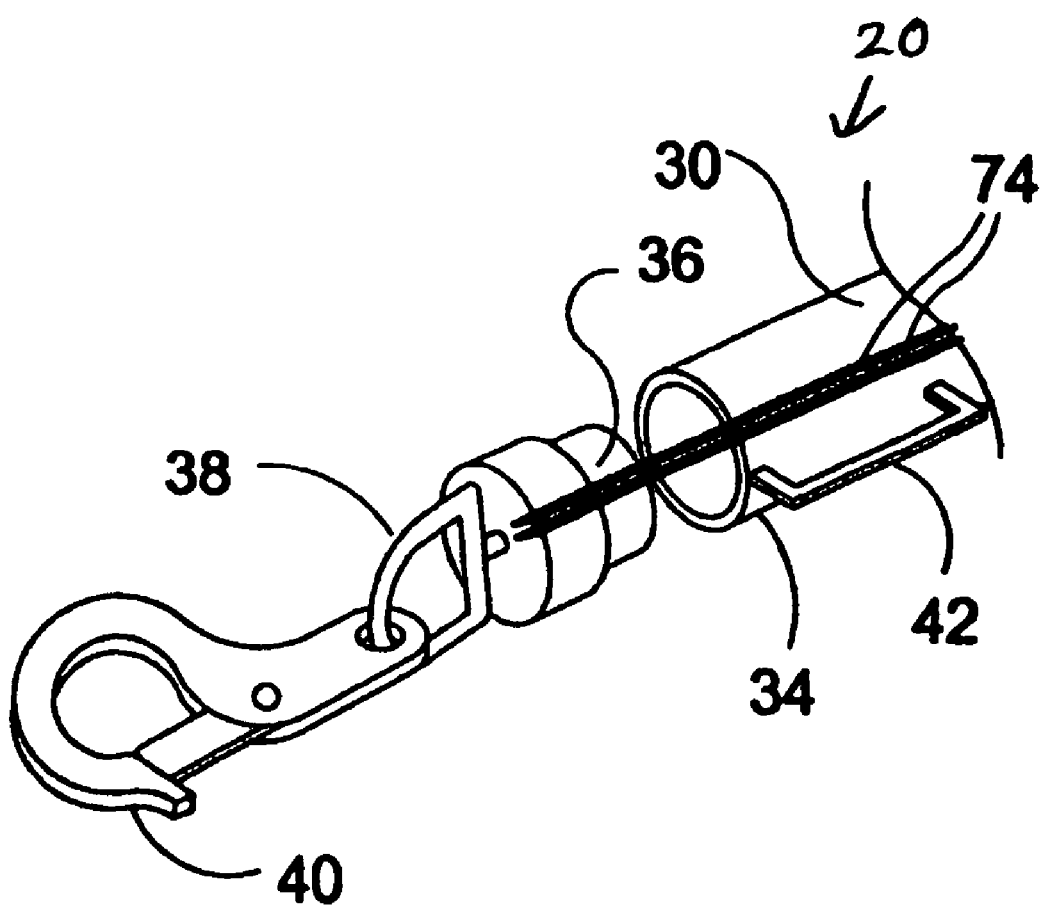
FIG. 4 is a detail of the exploded perspective view showing the first end cap and clip hook portion of an exemplary embodiment of the present invention.
Figure 5:
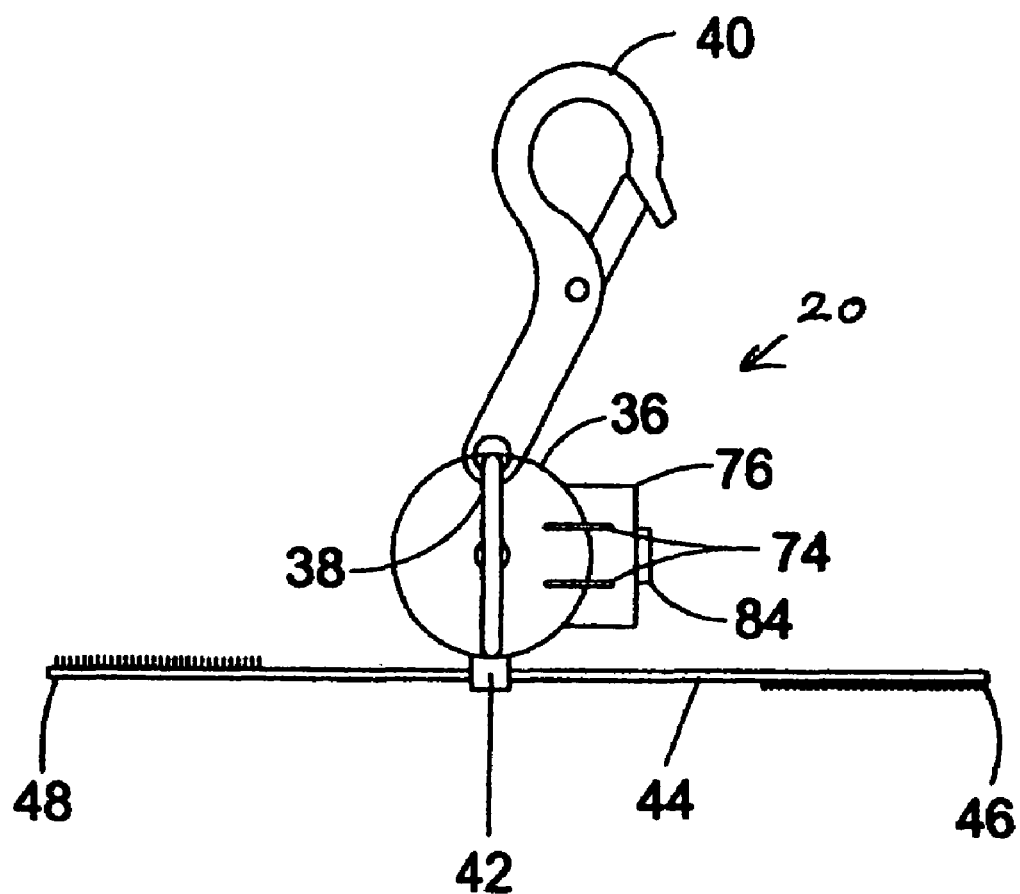
FIG. 5 is an end view of an exemplary embodiment of the present invention.
Figure 6:
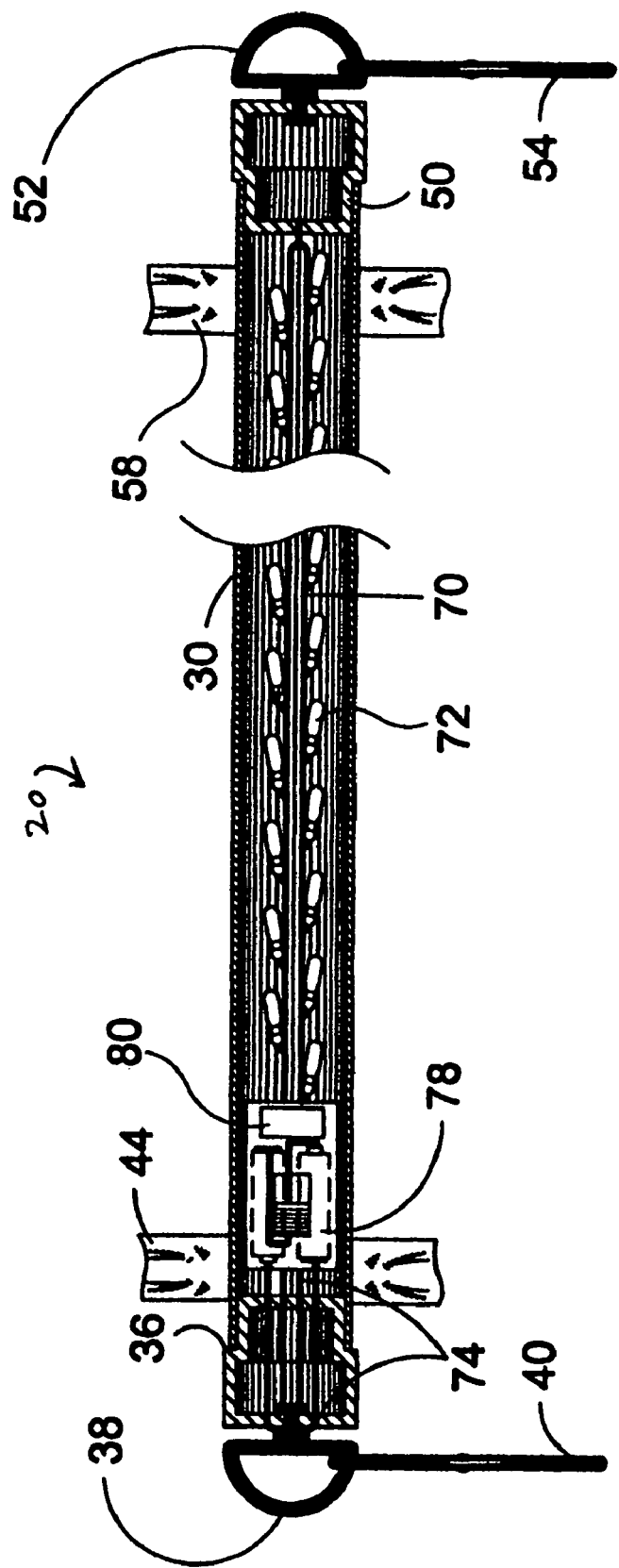
FIG. 6 is a partial sectional view of an exemplary embodiment of the present invention.

The control assembly 76 is attached to the elongated member and adapted for receiving electric power from the portable electric power source, in this embodiment, a battery 78, as shown in FIG. 6. As shown in FIG. 3, the control assembly also includes a flasher unit 80, a switch 82 for turning the lights 72 on and off, and a flasher unit control button 84 for a flasher unit. Using conventional technology, the control assembly provides light control functions including steady on, fast flash, slow flash, sequential lighting, and twinkle.

The control assembly has a protective lid 86 mounted to the control assembly on a spring-loaded hinge 88. The control assembly is sealed from the elements by a rubber seal 90 when the lid is shut.

Figure 7:
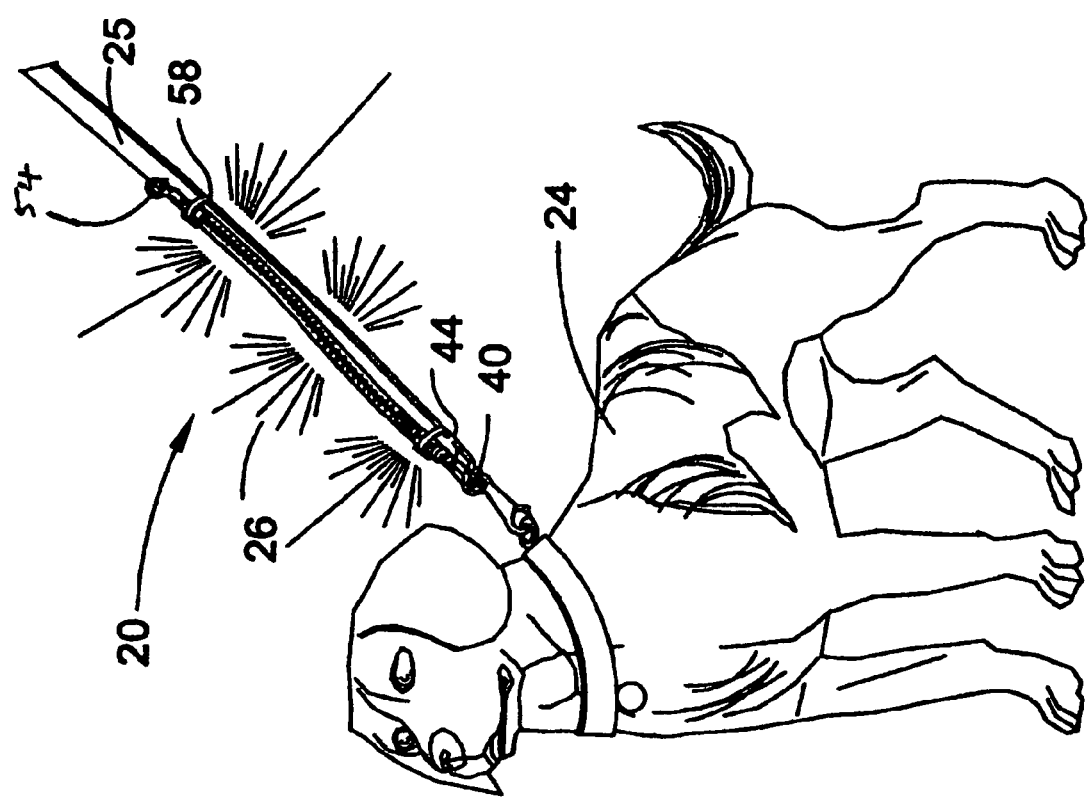
FIG. 7 illustrates an exemplary embodiment of the present invention in use on a dog leash.

Turning now to FIG. 7, the device 20 is shown attached to a dog leash 25. A reinforced attachment configuration is provided by the dual attachment means provided at both ends of the device 20. For example, to attach the device the user uses clip hook 40 to attach to an available opening on the conventional leash hardware. The first end attachment is doubly secured by then closing the fastener strap 44 about the leash 25 and the tube 30. Although the second clip hook 54 has no available leash hardware, the second end fastener strap 58 is nonetheless available for a tight fastening about the leash and the tube. This secures the device in parallel fashion along a substantial length of the leash, with the light 26 being emitted along the length in such a manner that the light will be in swaying and other movements as the dog 24 is walked.

Figure 8:
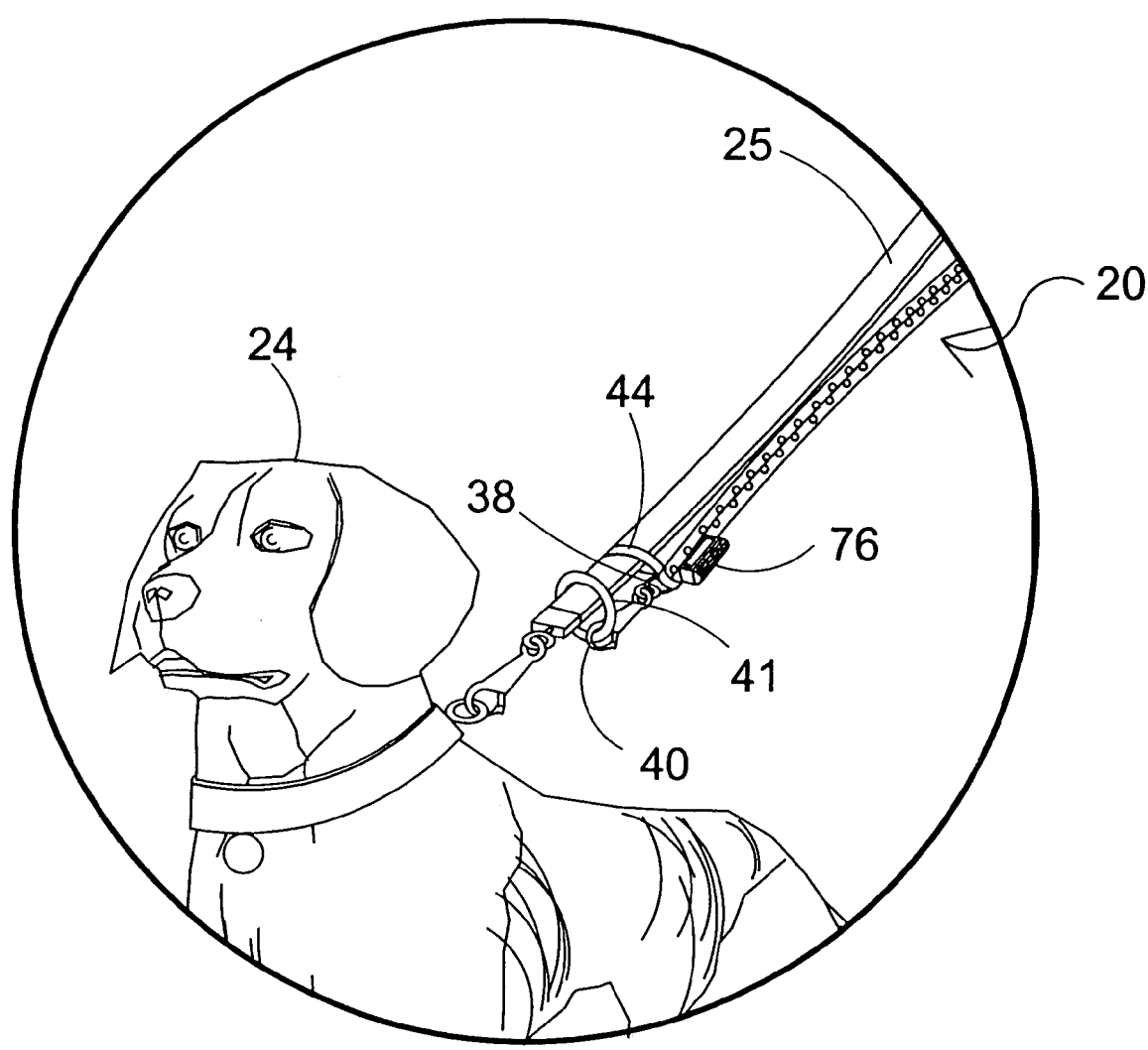
FIG. 8 illustrates an exemplary embodiment of the present invention in use on a dog leash, using a clip hook ring.

Turning now to FIG. 8, the device is shown to have a ring 41 available through which the dog leash 25 can be threaded. The clip hook 40 is attached to the ring 41 instead of the leash hardware, in this embodiment.

Figure 9:
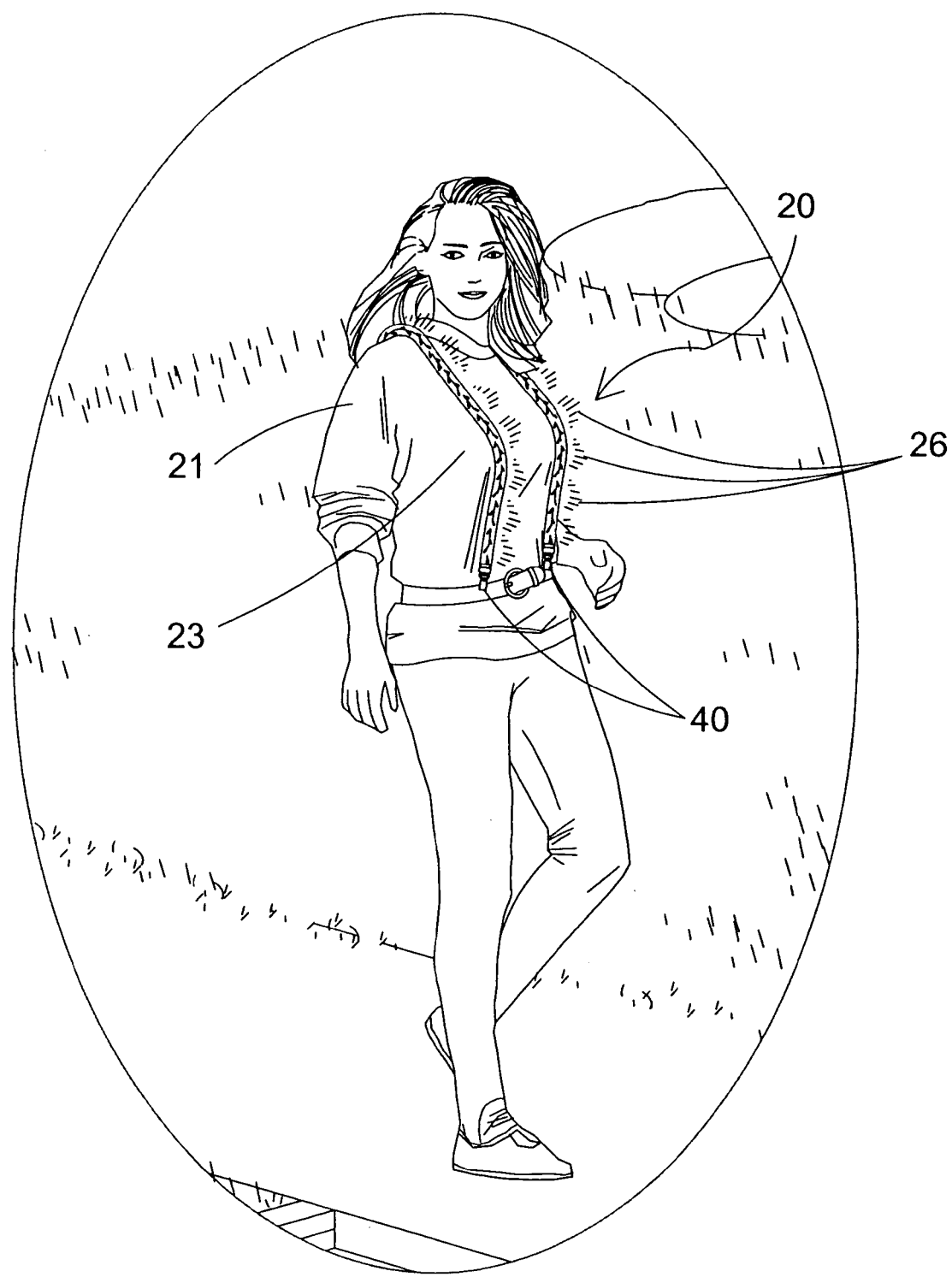
FIG. 9 illustrates an exemplary embodiment of the present invention in use over the user's torso.

Turning now to FIG. 9, an exemplary embodiment of the device 20 is illustrated wherein the user 21 has placed a pair of the devices 20 along her upper torso 23 in suspender fashion, with the clip hooks 40 and similar hooks on the opposite side of user (not shown) being attached to the user's belt.

Figure 10:
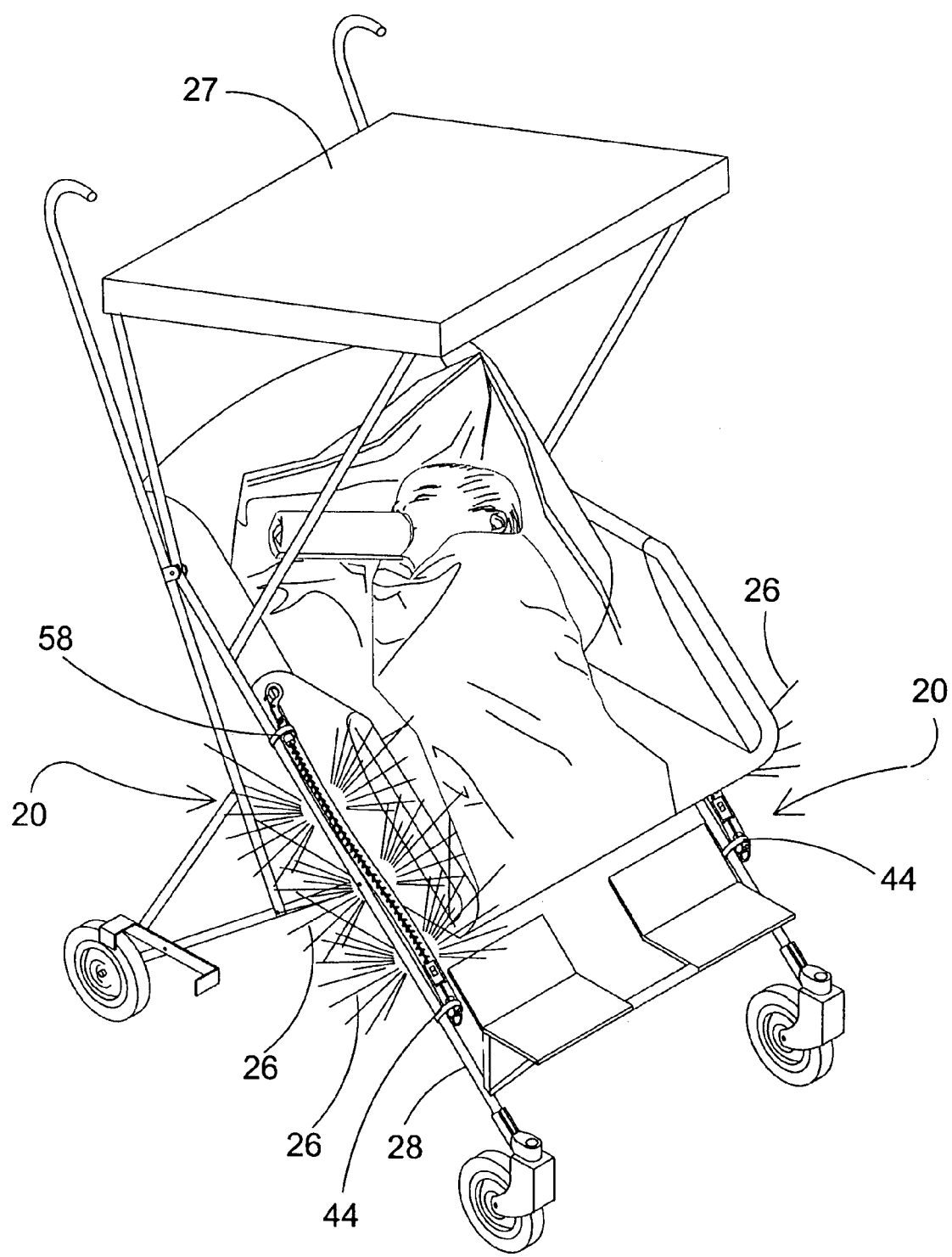
FIG. 10 illustrates an exemplary embodiment of the present invention in use on baby carriage frame members.

Turning to FIG. 10, a pair of the devices 20 is shown attached to a baby carriage 27 on a frame members 28. In this application the device is attached using the fastener straps 44,58. Using a pair of the devices in this fashion ensures that light 26 is visible in all directions from the baby carriage 27, whereas only one lighting device on the side of the carriage could be blocked from view on the other side.

Figure 11:
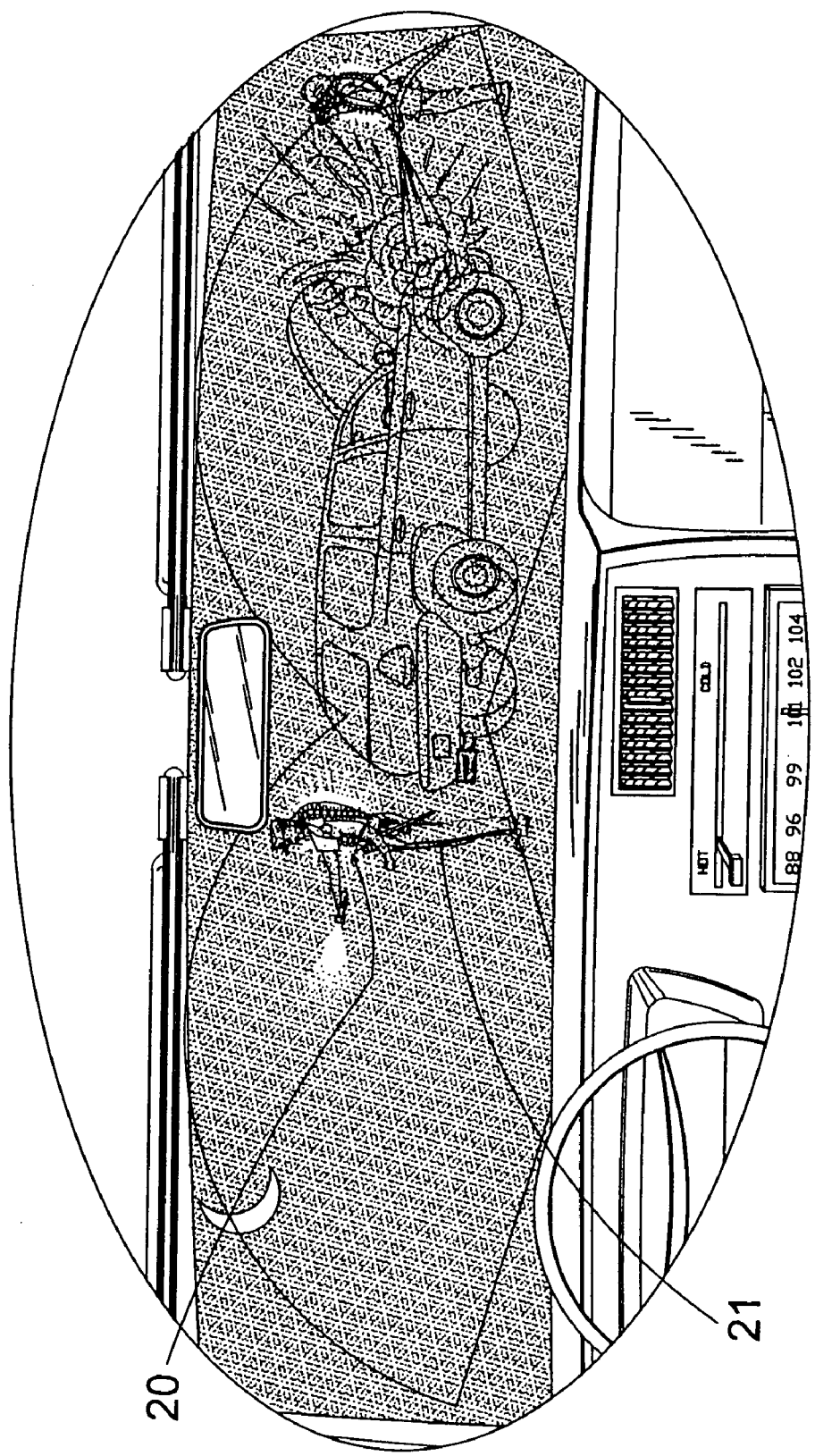
FIG. 11 illustrates an exemplary embodiment of the present invention in use on the bodies of emergency workers at a night emergency accident scene.

Turning to FIG. 11, the devices 20 are shown in various configurations on the bodies of emergency workers 21 at a dark accident scene, wherein the workers are made highly visible to oncoming traffic.

Turning to FIG. 12, another embodiment of the device 100 is shown to have a modified control assembly wherein a first portion 102 of the control assembly has the on-off switch 104, and a second portion 106 is detachable by twisting a conventional twist-lock assembly between the two control assembly portions. The second portion 106 contains the batteries, which can be easily replaced when the second portion is detached. Modified fastener straps 110,116 are attached directly to the tube 30, without loops 42,56. The ends 112,114,118,120 are closable as in previously described embodiments.

With respect to the above description then, it is to be realized that the optimum material and dimensional relationships for the parts of the safety light tube 20, will include variations in size, materials, shape, and form, which will occur to those skilled in the art upon review of the present disclosure. For example, in various embodiments the tube is entirely or partially transparent, including various levels of translucence. In other embodiments, fastener members include hook-and-loop portions positioned directly on the tube, and also include strings, belts, buckles and clasps.

All equivalent relationships to those illustrated in the drawings and described in the specification are intended to be encompassed by the present invention.

What is claimed as new and desired to be protected by Letters Patent is set forth in the appended claims:

1. An illumination device powered by a portable electric power source, comprising:
    a hollow, elongated member having a first end and a second end, the elongated member being at least partially transparent;
    a light string within the elongated member, the light string having a plurality of spaced light members;
    first and second end caps inserted into and closing off the first and second ends, respectively, of said elongated member;
    a control assembly mounted on the outside of and attached to the elongated member and adapted for receiving electric power from the portable electric power source, and further adapted for holding the portable electric power source, the control assembly having a switch, the control assembly being in electric communication with the light string such that operation of the switch electrically activates the light string and the light members;
    first and second U-shaped fastener loops mounted on the outside of said elongated member of said elongated member;
    first and second fastener straps threaded through said first and second fastener loops, respectively, for looping around an article to be illuminated after dark; and
    first and second end attachment members attached to the end caps of said elongated member for attachment to said article.

2. The device of claim 1, wherein the portable electric power source comprises at least one battery.

3. The device of claim 2, wherein the first end and second end attachment members each comprises a clip hook.

4. The device of claim 3, wherein each fastener strap comprises two ends each end having a hook-and-loop portion, the ends being fastenable by joining the hook-and-loop portions.

5. The device of claim 4, wherein each clip hook has a ring, the ring being hookable by the clip hook.

6. The device of claim 5, wherein the control assembly comprises a flasher unit and a flasher unit control for activating the flasher unit, such that when the flasher unit is activated the light members flash.

7. The device of claim 6, wherein the control assembly has a first portion and a second portion, the first portion having the switch and being attached to the elongated member, the portable electric power source being contained in the second portion, the second portion being removable from the first portion such that the second portion is separated from the elongated member.

8. An illumination device for and in combination with a leash for restraining a pet comprising:
- a hollow, elongated member having a first end and a second end, the elongated member being at least partially transparent;
- a light string within the elongated member, the light string having a plurality of spaced light members;
- first and second end caps inserted into and closing off the first and second ends, respectively, of said elongated member;
- a control assembly mounted on the outside of and attached to the elongated member and adapted for receiving electric power from a portable electric power source contained within said control assembly, the control assembly having a switch, the control assembly being in electric communication with the light string such that operation of the switch electrically activates the light string and the light members;
- first and second U-shaped fastener loops mounted on the outside of said elongated member of said elongated member;
- first and second fastener straps threaded through said first and second fastener loops, respectively, for looping around said leash for illuminating said leash after dark; and
- first and second end attachment members attached to the end caps of said elongated member for attachment to said leash.

* * * * *